United States Patent Office 3,463,805

Patented Aug. 26, 1969

3,463,805
PRODUCTION OF AMINONITRILES UNDER ADIABATIC CONDITIONS

Charles R. Morgan, Laurel, and John J. Godfrey, Silver Spring, Md., assignors to W. R. Grace & Co., New York, N.Y., a corporation of Connecticut No Drawing. Filed May 8, 1967, Ser. No. 636,658
Int. Cl. C07c *121/66, 121/28, 121/50*
U.S. Cl. 260—465.5 8 Claims

ABSTRACT OF THE DISCLOSURE

Aminonitriles are prepared by reacting an amine, formaldehyde, and HCN in the presence of an acidic catalyst under substantially adiabatic conditions.

The present invention relates to the production of aminonitriles, and more specifically to an improved method by which substantial yields of aminonitrile may be produced from aqueous reaction mixtures containing an amine, hydrogen cyanide, and an acid catalyst.

It is generally known that many amines (including ammonia) will react in the presence of an aqueous acid reaction medium with formaldehyde and hydrogen cyanide to produce aminonitriles. For example, ammonia, formaldehyde, and hydrogen cyanide will react according to the following generalized equation to produce nitrilotriacetonitrile (NTAN):

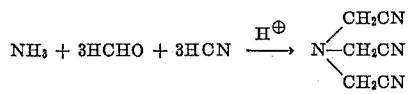

During the course of the above reaction considerable heat is liberated, i.e., about 35 to 40 kcal. per mole of NTAN produced. Due to the extremely exothermic nature of the reaction and the deadly poisonous nature of hydrogen cyanide prior workers have always exercised great caution in combining the reactants. In order to prevent violent exotherms and possible escape of hydrogen cyanide due to expected rapid pressure increases, the reactants have heretofore been combined in a manner which involves slow addition of either the amine or hydrogen cyanide ingredient to a premixed combination of the remaining reactants. The slow addition of the rate regulating ingredient has always been attended by careful heat exchange (temperature) control in order to avoid excessive liberation of hydrogen cyanide from the reaction mixture, and to avoid the necessity of employing excessive superatmospheric pressures.

Such slow combination of reactants and/or close temperature control is tedious and expensive, particularly when large volume production is contemplated.

It is therefore an object of the present invention to provide an improved method for producing aminonitriles.

It is another object to provide a method by which superior yields of aminonitriles may be quickly and efficiently obtained.

It is a further object to provide a method by which an amine, formaldehyde, and hydrogen cyanide may be quickly combined under aqueous-acidic reaction conditions to safely and rapidly produce aminonitriles.

These and still further objects of the present invention will become readily apparent to one skilled in the art from the following detailed description and specific examples.

Broadly, the present invention contemplates a method wherein an amine, formaldehyde, and hydrogen cyanide are combined in the presence of an aqueous-acid reaction media and permitted to react under substantially adiabatic conditions and autogenous pressure to produce aminonitriles.

More specifically, we have made the surprising discovery that if an amine, formaldehyde, hydrogen cyanide, and an aqueous acidic catalyst are combined under adiabatic and autogenous reaction conditions at an initial temperature of from about 0 to about 130° C., the reaction will proceed in a surprisingly rapid and orderly manner so as to produce a net temperature increase of about 50 to 100° C. Therefore, we have found, that contrary to all expectations of those skilled in the art, the reaction may be conducted in an orderly and safe manner without resorting to tedious and elaborate reactant addition and/or heat exchange control schemes heretofore employed by prior workers.

The amines used in the presently contemplated synthesis have been heretofore generally defined in the following U.S. patents to J. J. Singer et al.: 2,855,428, 3,061,628.

Typical amines having replaceable hydrogens in the present synthesis may be generally represented by formulae such as follows:

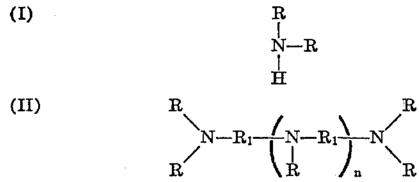

In the above Formulae I and II, R may represent hydrogen, alkyl, phenyl, alkylphenyl, phenylalkyl, hydroxalkyl or cycloalkyl. $R_1$ may represent alkylene or phenylene. In Formulae II above, $n$ may have a value of from about 0 to 20.

In addition to amines having replaceable hydrogen atoms, tertiary amines such as hexamethylenetetramine (HMTA), and other tertiary amines arising from the condensation of amines with formaldehyde may also be utilized.

Typical products derived from tertiary amines may be represented by the following general formula:

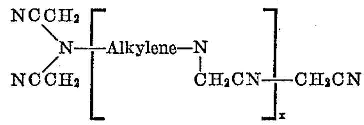

wherein up to 2 of the positions occupied by $—CH_2CN$ groups may be occupied by $—CH_2OH$ and/or $CH_2CH_2OH$ groups, $x$ is an integer including 0 having a value of up to about 4, and alkylene is lower alkylene having from about 1 to 4 carbon atoms.

Specific examples of amines used in our invention are ammonia, ethylenediamine, diethylenetriamine, triethylenetetramine, propylenediamine, dipropylenetriamine, tripropylenetetramine, benzylamine, trans-1,2-cyclohexanediamine, trans-1,2-cyclopentenediamine, hydroxethylethylenediamine, N - dihydroxy, ethylethylenediamine, aniline, toluidene, N-hydroxyaniline, hexamethylenetetramine, and methyleneaminoacetonitrile.

The formaldehyde utilized in the practice of our invention may be commercially available 37% aqueous solution of formaldehyde or the formaldehyde may be partially or entirely derived from other sources such as paraformaldehyde or hexamethylenetetramine or any other suitable condensation products of amine and formaldehyde.

The HCN reactant may be obtained from any suitable commercial source and is normally introduced into the reaction system as a liquid, gas or aqueous solution thereof.

The acidic catalyst used to promote nitrile formation in the present synthesis may be an aqueous solution of mineral or organic acid. Alternatively, the reaction mixture may comprise acidic ion exchange resin or a combination of acidic ion exchange resin with a mineral or organic acid. Typical mineral and organic acids which may be use das catalysts include sulfuric acid, hydrochloric acid, nitric acid, acetic acid, and paratoluenesulfonic acid; and ammonium salts thereof.

When an acidic ion exchange resin is used as the catalyst both synthetic organic, and numerous naturally occurring and manmade inorganic cation exchange resins are suitable. Typical examples of organic synthetic ion exchange resins are the weakly acidic carboxylic cation exchange resins such as polymethacrylic resin, and the more strongly acidic sulfonated polystyrene type of cation exchange resins well known to those skilled in the art. Inorganic ion exchange resins which may be used in their acid form are alumina, silica-alumina, silica-magnesia, silica-zirconia, titania, zeolite (particularly in the $H^+$ or $NH_4^+$ form), bentonites, kaolin, montmorillonite, phosgenite, and vermiculite.

In conducting the present reaction process, it is generally preferred that the formaldehyde and HCN reactants both be present in the approximately stoichiometric amounts required to react with the amine reactant and yield the desired aminoacetonitrile. However, an excess of formaldehyde and HCN may be conveniently used. Generally speaking, it is found that when both the formaldehyde and HCN components are used in up to 20% mole excess of that required to react with the amine, satisfactory results will occur.

The reaction contemplaed herein occurs in the presence of an aqueous-acidic reaction medium. As indicated above, the reaction catalyst may be either a water soluble organic or inorganic acid, or the required acidic media may be provided by the presence of an aqueous slurry of an acid type ion exchange resin or by a combination ion exchange resin and organic or inorganic acid. When a soluble acid is used to catalyze the present reaction an acid concentration of from about 0.001 to about 2 equivalents of acid per mole of amine nitrogen to be reacted is found to yield satisfactory results. In the case where a solid ion exchange resin is utilized the use of an amount of resin which yields from about 0.1 to about 4 equivalents of acid substituent per mole of nitrogen present in the reaction mixture is found to yield the desired result.

The acid ion exchange resin can be used either as an aqueous slurry which is suspended in the solution of reactants throughout the course of the reaction or alternatively, the solid ion exchange resin may be maintained as a fixed bed within the reaction zone maintained at the required reaction temperature.

In order to produce the desired result, the reactants are combined in the ratios indicated above and placed in a reaction zone which is adapted to provide substantially adiabatic-autogenous reaction conditions. It is found that when the reaction is permitted to exotherm under adiabatic conditions, a temperature rise on the order of from about 50 to 100° C. is observed, and the corresponding autogenous pressure increase is on the order of from about 1 to about 3 atmospheres. The amount of temperature increase observed depends upon both the degree of cyanomethylation (completion of reaction) and the heat capacity of the system under consideration. Generally speaking, the heat capacity is primarily dependent upon the amount of water present in the reaction mixture. Thus, when reaction mixtures which contain about 25% by weight water are used, the heat capacity is relatively low and temperature increases of about 90–100° C. are observed. When the reaction mixture contains about 75% by weight water, the relative heat capacity is high, and a lower temperature rise on the order of 50–60° C. is observed.

The maximum autogenous pressure achieved during the reaction is primarily dependent upon the temperature and the amount of excess HCN which is present. When a 10% excess of HCN is present a pressure of about 1 atmosphere is observed. On the other hand, when the excess HCN is raised to about 20%, a pressure of up to about 3 to 4 atmospheres is observed at 100° C.

The reactants are preferably combined and placed into the adiabatic reaction zone at an initial temperature of from about 0 to about 130° C. It is found that when these initial temperatures are utilized, the reaction will initiate and proceed to completion within a time of from about ½ to about 60 min. Consequently when using an initial reaction temperature of about 0 to 40° C. it is found that a final reaction temperature as high as 100 to 140° C. is obtained.

In view of the fact that only minimum autogenous pressures are attained in the practice of the present invention, it is seen that our method provides a means for producing aminonitriles which does not require the utilization of closely controlled temperature or reactant addition conditions.

The present adiabatic reaction procedure may be conducted on either a batchwise or continuous basis. When the procedure is conducted on a batchwise basis, an appropriate nonvented, insulated reaction kettle is used to contain the reactants under substantial adiabatic-autogenous reaction conditions until the reaction reaches completion. When the procedure is carried out continuously the reactants are pumped through an elongated reaction zone which is maintained within an insulated reaction chamber. Advantageously, the insulated reaction chamber is filled with an agitated heat exchange medium which serves to transfer heat from the reacting reaction mixture to the incoming reactants. In this manner the heat evolved from the reaction is used to increase the temperautre of the incoming reactants and thereby shorten the overall period required for reaction.

The present reaction may take place in conventional stainless steel or glass-lined equipment wherein the reaction zone is provided with adequate insulation to provide substantial adiabatic, i.e., nonheat transfer, reaction conditions. Furthermore, the reaction apparatus should be designed so that autogenous pressuring increases on the order of 3 atmospheres may be tolerated.

Subsequent to the reaction, the final reaction mixture, which comprises the desired aminoacetonitrile and minor amounts of acid catalyst, is preferably cooled to a temperature of from about 50 down to 10° C. whereat the aminonitrile precipitates from the solution and may be readily recovered by conventional decantation and/or filtration techniques. The remaining reaction media subsequent to the aminonitrile separation step contains residual amounts of reactants and acid catalyst in solution. This reaction media may be conveniently recycled through the reaction process after addition of suitable amounts of makeup ingredients.

The aminonitrile products obtained during the present reaction possess a high degree of purity and may be readily hydrolyzed to form the corresponding amino acid derivatives. The hydrolysis reaction may be conducted by way of any well known techniques such as reaction with sodium hydroxide at temperatures ranging from about 10 to 100° C. In one specific embodiment, the aminonitrile reaction product is conducted directly from the reaction zone at elevated temperatures to a hydrolysis procedure without intermediate isolation. The resultant acid derivatives are utilized for many purposes including chelate applications.

Having described the basic aspects of the present invention the following examples are given to illustrate specific embodiments thereof.

EXAMPLE I

A charge of 600–700 grams of a reaction mixture which contained a mole ratio of ammonia to formaldehyde to HCN of 1 to 3.3 to 3.3 was placed in a one-liter Dewar flask. The flask was then sealed. The mixture contained 375 grams of water and varying amounts of acid catalyst indicated in the table below. Numerous runs were made using various reaction times. An initial reaction temperature on the order of 20° C. was utilized. During the course of the reaction a temperature increase on the order of from about 69 to 89° C. was noted, and a corresponding pressure increase of from about 1.0 to 1.5 atmospheres was observed. Numerous runs conducted using the described technique are tabulated below wherein the acid catalyst concentration amounts were varied from about 3.6 to about 13.0 percent by weight in the water contained in the reaction mixture.

These results are tabulated in table below:

TABLE

| Run No. | Acid conc. (percent by wt. in $H_2O$) | Yield (percent) | Δ T. (° C.) |
|---|---|---|---|
| 1 [1] | 3.6 | ---------- | 69 |
| 2 [1] | 7.1 | 89 | 85 |
| 3 [1] | 10.6 | 89 | 86 |
| 4 [1] | 14.2 | 88 | 86 |
| 5 [1] | 14.2 | 89 | 89 |
| 6 [1] | (2) | 88 | 89 |
| 7 [1] | 3.6 | 84 | 86 |
| 8 [1] | 14.2 | 82 | 87 |
| 9 [1] | [4] 23.8 | 91 | 85 |

[1] Using 30% hexamethylenetetramine (HMTA) solution in $H_2$ to provide $NH_3$.
[2] Using 25 g. Amberlyst 15 sulfonated styrene resin.
[3] $NH_3$ used as source of $NH_3$ to provide initial solution of $(NH_4)_2SO_4$.
[4] p-Toluene sulfonic acid.

EXAMPLE II

An insulated, unvented 200-gallon glass-lined reactor was charged with the following (in the order given) at an initial temperature of 13° C.:

(1) 248 lbs. water,
(2) 99 lbs. 12 oz. 96% $H_2SO_4$,
(3) 361 lbs. 14 oz. 37% $CH_2O$ in water,
(4) 271 lbs. 8 oz. HCN,
(5) 328 lbs. 10 oz. 30 wt. percent HMTA in water.

After the HMTAwas blown in, the exothermic cyanomethylation commenced. After about 30 min. the reaction mixture reached 100° C., with a temperature rise of 87° C. The internal pressure at this point was 25 p.s.i.g. After a 15 minute hold time at 100° C., the reaction mixture was cooled (NTAN separates from sloution at 85–90° C.) and the solid NTAN collected. The weight of dry NTAN was 350.5 lbs. (92.9% of 377.3 lbs. theory).

EXAMPLE III

A continuous reaction device was constructed which comprised a coiled stainless steel reaction tube suspended in an insulated container filled with a water heat exchange medium. The medium was heated by external means to a temperature of 100° C.; then the source of heat was removed. A reaction mixture comprising:

250 lbs. $H_2O$
99 lbs. $H_2SO_4$ (96%)
362 lbs. HCHO (37% in $H_2O$)
272 lbs. HCN
328 lbs. HMTA (30% in $H_2O$)

was pumped through the tube at a rate that permitted a residence time of 15 minutes. The temperature of the mixture entering the reactor was 15° C. and the temperature of the reaction mixture leaving the device was 100° C. The temperature of the well agitated heat exchange medium within the reactor was maintained at a constant 100° C. without addition of external heat. After a single pass through the reactor a 90% yield of NTAN was recovered from the reaction mixture.

EXAMPLE IV

A reaction device similar to that of Example III was constructed. However, two inlet pipes which joined in a T before being connected to the coiled reaction tube were provided. The inlet tubes and T were located within the same heat exchange medium in which the reaction tube was placed. The following reactants maintained at an initial temperature of 15° C. were metered uniformly into the two inlet tubes:

Tube 1—
250 lbs. $H_2O$
99 lbs. $H_2SO_4$ (96%)
362 lbs. HCHO (37% in $H_2O$)
328 lbs. HMTA (30% in $H_2O$)

Tube 2—
272 lbs. HCN

As in Example III the heat exchange medium was heated to 100° C. by external heating means and the source of heat was then removed. As the reactants were pumped through the tubes they were preheated to about 100° C. before being combined at 100° C. The mixture was pumped at a rate that provided a residence time of about 5 minutes. After one pass through the reactor, the reaction mixture was cooled, and a 94% yield of NTAN was recovered.

EXAMPLE V

A reaction device was constructed as follows:

A first heat exchange bath containing an initial coiled reaction tube, and a second heat exchange bath containing a final reaction tube were placed within an insulated chamber. The first and second heat exchange baths were interconnected by way of an adjustable circulation means. The temperature of the first bath was heated to an initial 40° C. and a reaction mixture similar to that set forth in Example III maintained at 15° C. was pumped through the initial reaction tube, then conducted through the final reaction tube. The temperature of the mixture was heated to about 40° C. in the initial tube and then was permitted to exotherm to about 100° C. in the final reaction tube. The first heat exchange bath was maintained at 40° C., while the second heat exchange bath was maintained at 100° C., by maintaining appropriate circulation of the medium between the first and second baths. No addition or removal of heat was found to be necessary. It was found the residence times of 5 to 15 minutes provided yields of NTAN ranging from 75 to 94%.

The above examples clearly indicate that substantial yields of aminonitriles may be quickly and conveniently obtained using the method described herein.

We claim:

1. In a process for preparing an aminonitrile by the exothermic reaction of; (i) ammonia or an amine selected from the group consisting of hexamethylenetetramine, ethylenediamine, diethylenetriamine, triethylenetetramine, propylenediamine, dipropylenetriamine, tripropylenetetramine, benzylamine, trans-1,2-cyclohexanediamine, trans-1,2-cyclopentenediamine, hydroxyethylenediamine, N-dihydroxyethylethylenediamine, aniline, toluidine, N-hydroxyaniline, and methyleneaminoacetonitrile; (ii) formaldehyde; and (iii) hydrogen cyanide, the reactants being present in quantities varying from about stoichiometric to an excess of up to about 20 mole percent of hydrogen cyanide and up to about 20 mole percent of formaldehyde based on the ammonia or amine, in an acidic aqueous reaction medium in a reaction zone under autogenous pressure, the improvement comprising:

(a) combining said reactants and said medium at about 0–130° C. to form a reaction mixture and maintaining said reaction mixture in said reaction zone under substantially adiabatic conditions, whereby said reactants react to; (i) produce a temperature rise of about 50–100° C.; (ii) produce a pressure increase of about 1–4 atmospheres; and (iii) form said aminonitrile; and
(b) separating and recovering said aminonitrile.

2. The method of claim 1 wherein the acidic component of the acidic aqueous reaction medium is sulfuric acid, about 0.001–2 equivalents of said acid being present per mole of ammonia or per mole of amine nitrogen.

3. The method of claim 1 wherein said ammonia or amine, formaldehyde, and hydrogen cyanide reactants are combined in a ratio of about 1 to 3 to 3 up to about 1 to 3.6 to 3.6.

4. The method of claim 1 conducted in a continuous manner.

5. The method of claim 1 wherein the catalyst is p-toluene sulfonic acid.

6. In a process for preparing nitrilotriacetonitrile by the exothermic reaction of; (i) ammonia or hexamethylenetetramine; (ii) formaledhyde; and (iii) hydrogen cyanide, the reactants being present in quantities varying from about stoichiometric to an excess of up to about 20 mole percent of hydrogen cyanide and up to about 20 mole percent of formaldehyde based on the ammonia or amine, in an acidic aqueous reaction medium in a reaction zone under autogenous pressure, the improvement comprising:

(a) combining said reactants and said medium at about 0–130° C. to form a reaction mixture and maintaining said reaction mixture in said reaction zone under substantially adiabatic conditions, whereby said reactants react to; (i) produce a temperature rise of about 50–100° C.; and (ii) form said nitrilotriacetonitrile; and (b) separating and recovering said nitrilotriacetonitrile.

7. The process of claim 6 in which the acidic component of the acidic aqueous reaction medium is sulfuric acid, about 0.001–2 equivalents of said acid being present per mole ammonia or per mole of amine nitrogen.

8. In a process for preparing nitrilotriacetonitrile by the exothermic reaction of; (i) ammonia or hexamethylenetetramine; (ii) formaldehyde; and (iii) hydrogen cyanide, the reactants being present in quantities varying from about stoichiometric to an excess of up to about 20 mole percent of formaldehyde based on the ammonia or amine, in an acidic aqueous reaction medium in a reaction zone under autogenous pressure, the improvement comprising:

(a) combining said reactants and said medium at about 0–40° C. to form a reaction mixture and maintaining said reaction mixture in said reaction zone under substantially adiabatic conditions, whereby said reactants react to; (i) produce a temperature rise of about 50–100° C.; (ii) produce a pressure increase of about 1–4 atmospheres; and (iii) form said nitrilotriacetonitrile; and (b) separating and recovering said acetonitrile.

References Cited

UNITED STATES PATENTS

| | | | |
|---|---|---|---|
| 2,855,428 | 10/1958 | Singer et al. | 260—465.5 |
| 3,061,628 | 10/1962 | Singer et al. | 260—465.5 |
| 3,337,607 | 8/1967 | Wollensak | 260—465.5 |

JOSEPH P. BRUST, Primary Examiner

U.S. Cl. X.R.

260—464, 465, 514, 518, 534